United States Patent [19]

Schultz

[11] 3,841,714
[45] Oct. 15, 1974

[54] PARKING BRAKE CONTROL
[75] Inventor: Forrest O. E. Schultz, Owosso, Mich.
[73] Assignee: Midland-Ross Corporation, Cleveland, Ohio
[22] Filed: May 2, 1973
[21] Appl. No.: 356,300

[52] U.S. Cl. .................................... 303/71, 303/9
[51] Int. Cl. ........................................... B60t 13/22
[58] Field of Search .............. 303/9, 29, 71, 52, 80, 303/50

[56] References Cited
UNITED STATES PATENTS
3,224,815  12/1965  Horowitz ............................. 303/50
3,511,276  5/1970   Jessen et al. ........................ 303/9
3,712,686  1/1973   Kersting .............................. 303/71
3,744,848  7/1973   Hardwick et al. .................... 303/9

Primary Examiner—Trygve M. Blix
Assistant Examiner—Stuart M. Goldstein
Attorney, Agent, or Firm—Irvin L. Groh

[57] ABSTRACT

A parking brake control valve and system including a spring applied brake actuator which is released by air, the control valve receiving air from the service brake reservoir and being manually controlled to deliver air to the actuator to release the brakes or to exhaust air from the actuator to apply the brakes. The control valve is automatically operated in response to pressure below a predetermined minimum in the service brake system to apply the parking brakes. In the event of automatic application of the parking brake actuator, the control valve may be manually maintained in a parking brake release position for emergency operation of the vehicle.

3 Claims, 2 Drawing Figures

PARKING BRAKE CONTROL

SUMMARY OF THE INVENTION

This invention relates to vehicle air brake systems and more particularly to a parking brake control and system.

Proposed safety regulations require that air brake systems used on trucks, buses and towed vehicles incorporate a parking brake system as well as an automatic braking system which will apply the usual vehicle brakes, or in the alternative, the parking brakes when the supply pressure falls below some predetermined minimum. Such systems must each function in a prescribed manner and meet a number of requirements which include the necessity for a separate parking brake reservoir which, if it fails, does not affect the service brake system; a control which makes it possible to release the parking brakes at least once after they have been automatically applied and which prevents release of the brakes if they are incapable of being automatically reapplied.

Although the various functions and requirements may be accomplished in prior art systems, a number of valves and lines must be used, often including more than one manually operated control valve which complicates not only the system but also use of a system by the operator.

In addition to the various requirements of the operation, it is desirable to protect the parking brake system from pressure fluctuations. Usually, air brake compressors are driven continuously but compress air up to approximately 125 psi and the compression stops until pressure in the air system drops to approximately 100 psi at which time compression is resumed. This can impose pressure fluctuations in the components of the supplied system which it is desirable to isolate.

It is an object of invention to provide a parking brake control valve system in which the parking brakes can be manually applied and released and in which the brakes are automatically applied when presssure in the service brake system drops to some predetermined minimum, all by operation of a single control valve.

Another object if the invention is to provide a parking brake control valve system in which the parking brakes remain in the applied position after either manual or automatic application until manually released.

Still another object is to provide a parking brake control valve requiring continual manual effort to release the brakes if servive brake pressure has decrease below a preselected minimum.

Another object is to isolate the parking brake system from fluctuations of air pressure in the air delivery system.

The above as well as other objects will become apparent from the following description, the appended claims and the accompanying drawings disclosing a preferred embodiment of the invention.

DETAILED DESCRIPTION

Figure 1:
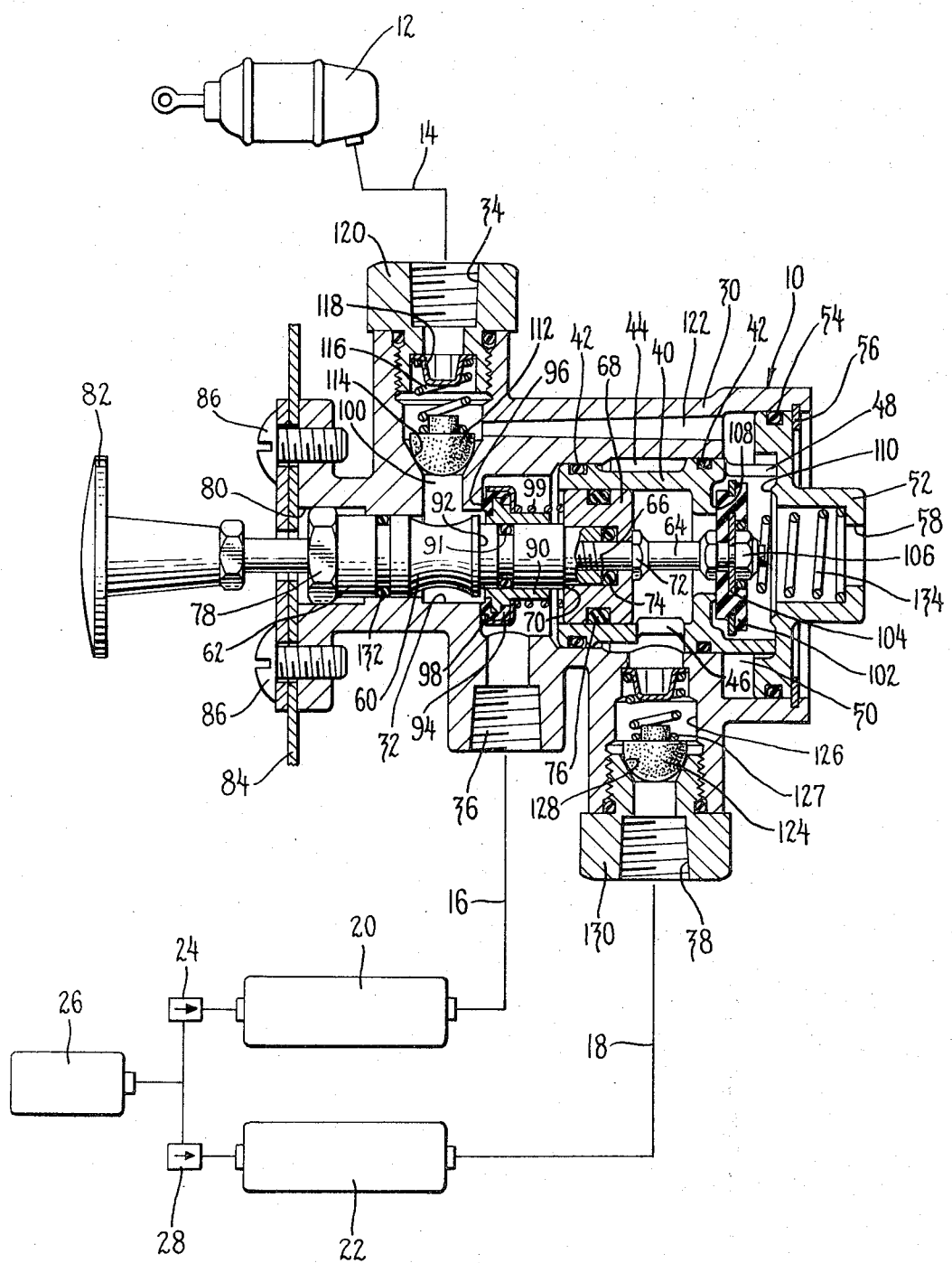
FIG. 1 is a longitudinal cross-sectional view of a parking brake control valve with associated components of the parking brake system shown schematically.

The parking brake system in which the parking brake control valve 10 is used includes one or more parking brake actuators 12 of the so-called spring-set type which are well known in the art and do not require a detailed description for a full understanding of the invention. Such parking brake actuators are of the type utilizing a spring or springs as a source of energy to apply the parking brakes and use air under pressure to overcome the spring force to release the parking brakes. The actuators 12 are connected to the parking brake control valve 10 by an air line 14. Also connected to the control valve 10 are the lines 16 and 18 in fluid communication with air reservoirs 20 and 22, respectively. The air reservoir 20 is connected through a one way check valve 24 to a supply system indicated at 26 and the reservoir 22 is connected through another one way check valve 28 to the air supply 26. The air reservoir 20 is referred to as the service reservoir and is the source of energy for applying the service brakes of the truck, bus or towed vehicle. The reservoir 22 is referred to as the protected reservoir since its pressure, once established must remain indepenedent of fluctuations or loss of pressure in the service reservoir.

The parking brake control valve 10 includes a generally hollow housing 30 which has an irregular stepped bore 32 extending the length of housing 30. The housing 30 provided with an air pressure supply port 34 which communicates the interior of the housing with the line 14 to the parking brake actuator 12, an inlet port 36 communicating with line 16 to the service reservoir 20 and another inlet port 38 communicating with the line 18 to the protected reservoir 22.

Disposed within the housing is a generally tubular member 40 having axially spaced O-rings 42 in fluid tight engagement with the bore in housing 30 to form an annular chamber 44 around the exterior of the tubular member 40. The chamber 44 communicates with the interior of the tubular member 40 by means of radial opening 46. Another radial opening 48 is formed in the end of the tubular member 40 to communicate with an annular chamber 50 formed around the exterior of the tubular member 40 at the end of the housing 30. The end of the housing 30 is closed by a cover 52 which is sealed to the interior of the housing by an O-ring 54 and held in abutment with the tubular member 40 by a snap ring 56. The cover 52 has an exhaust opening 58 through which the interior of the housing communicates with the atmosphere.

A plunger 60 made up of an outboard portion 62 and an inboard portion 64 securely joined together at a threaded junction 66 is slidably supported in the bore 32. A piston 68 is secured between a shoulder 70 on the outboard plunger portion 62 and an enlarged portion 72 on the inboard portion 64 and is sealed relative to the plunger by an O-ring gasket 74. The piston 68 is slidably in the interior of the tubular member 40 and has a fluid tight seal 76.

The outboard portion of the plunger 60 is provided with a fixed hexagon portion 78 which is slidably guided in a complementary shaped recess 80 in the housing 30 to maintain the plunger 60 in non-rotatable relation in the housing so that knob 82 fastened to the end of the plunger 60 remains in non-rotatable position and any legend on the face of the knob 82 remains properly oriented. The entire control valve 10 is mounted, preferably to a wall 84 of the operators compartment by fasteners 86 with the knob 82 within easy reach of the driver for manually moving the plunger 60 on its axis. A valve member 90 is slidably supported on the plunger 60 between the piston 68 and an annular shoulder 92 on the plunger 60 and is sealed there to by means of O-ring 91. The valve member 90 is provided with a rubber-like valve element 94 having an annular lip 96 which is engageable with an interior wall portion of the housing which forms a valve seat 98.

In the position shown, the valve member 90 is urged toward the left by a spring 99 seated against the piston member 68 to urge the annular lip 96 into engagement with the wall portion 98. This is effective to close communication between the port 36 and a radial passage 100 leading to port 34. The end of the plunger 60 opposite to the knob 82 is provided with a valve member 102 having a rubberlike surface and a rigid disc-shaped insert 104. The valve member 102 is sealingly connected to the plunger by a threaded fastener 106 and in the position shown in FIG. 1 is in sealing engagement with an annular lip 108 formed within the tubular member 40. An opposite face of the valve member 102 is adapted upon movement of the plunger 60 to the position in FIG. 2 to engage another annular lip 110 forming a valve seat on the cover 52. In the latter position, the valve member 102 closes communication between the exhaust opening 58 and the interior of the housing.

A one-way check valve element 112 is disposed between supply port 34 and passage 100 and is held in a closed position against a tapered seat 114 by a spring 116 which acts against a combination retainer and stop element 118. The element 118 is positioned within a fitting 120 which forms the supply port 34. In the position shown in FIG. 1, port 34 is closed to passage 100 but is in communication with an elongated passage 122 connected to the annular chamber 50. Another one-way check valve 124 is interposed in a passage 126 between inlet port 38 and the annular chamber 44. In the position shown in FIG. 1, the check valve element 124 is urged by a spring 127 to a closed position against a tapered seat 128 formed in a fitting 130 which also forms the inlet port 38.

The outboard portion 62 of the plunger 60 is provided with an O-ring 132 which seals the plunger 60 relative to the housing 30 and prevents fluid passage. The entire plunger assembly is urged to the left as seen in FIG. 1 by spring 134 seated against valve member 102 and the end cap 52.

In normal operating conditions, air under pressure above some predetermined minimum exists in both of the reservoirs 20 and 22. Conventional spring set brake actuators such as the unit indicated at 12 are released or are put into released position by introducing air under pressure through the conduit 14. Conversely, they are applied or put into applied position by exhausting the air from the actuator 12 through the line 14, the passage 122 to the annular chamber 50 and through the open port 58 to the atmosphere as best seen in FIG. 1. With the control valve 10 in this position, air under pressure in the service reservoir 20 is prevented from entering the parking brake actuator by the valve lip 96 closed on its seat 98. The air under pressure in the protected reservoir 22 is prevented from entering the parking brake actuator 12 by valve member 102 which is seated on the annular valve seat 108.

Figure 2:
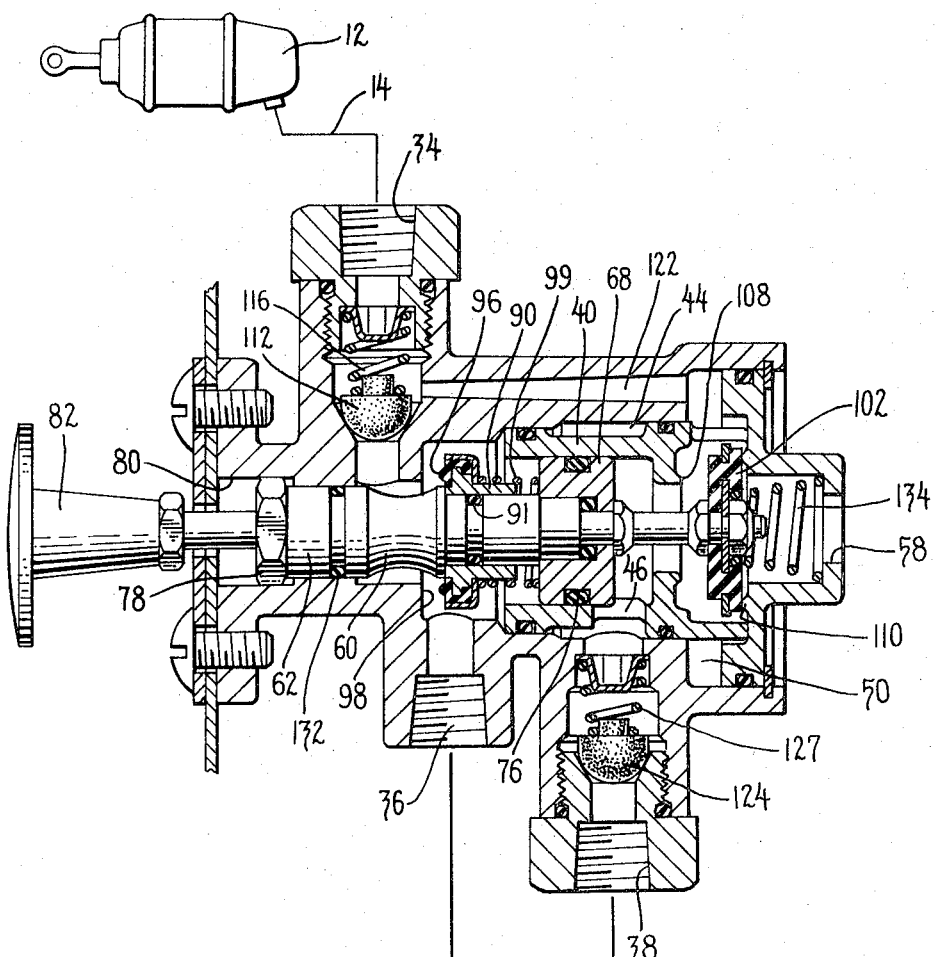
FIG. 2 is a view similar to FIG. 1 showing the valve under another condition of operation.
Figure 2:
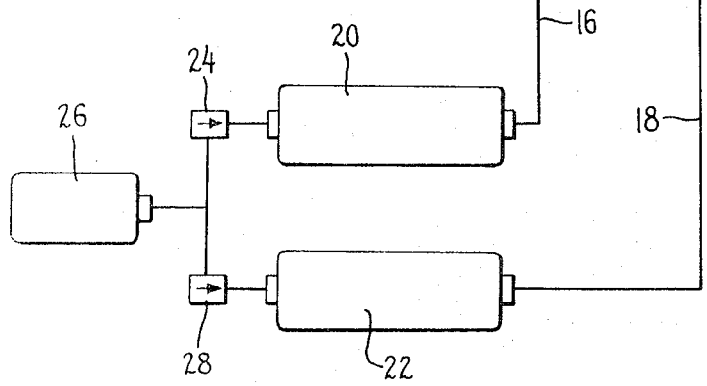

The parking brakes are released when the plunger 60 is manually pushed to the right and the parking brake control valve 10 is in the position illustrated in FIG. 2. Under this condition, the parking brake actuators 12 are under air pressure from the protected reservoir 22 which opens the check valve 124 against the relatively light spring 127. The air enters the annular cavity 44 through the opening 46 and through the open valve 102, 108, the annular cavity 50 and the elongated passage 122 to the outlet port 34 and the line 14. Under this condition, the opening 58 to the atmosphere is closed by the valve 102 in engagement with the annular lip 110.

The parking brake control valve 10 will not remain in the brake release position illustrated in FIG. 2 unless a preestablished pressure value is attained or exceeded in the protected reservoir 22. This reestablished pressure value is usually in the order of 45 psi. If, for example, the pressure in the protected reservoir 22 is less than 45 psi and the parking brake control valve 10 is placed in its brake released position as shown in FIG. 2, it will automatically return to the brake applied position shown in FIG. 1. This operation is accomplished by the force of the spring 134 urging the plunger 60 toward the left as viewed in the drawings. The force of the spring 134 is resisted by the air pressure in the protected system associated with the protected reservoir 22 which acts to the right on the effective area defined by the annular lip forming the valve seat 110. When the force resulting from the pressure in the protected reservoir 22 is less than the force of the spring 134 the plunger is moved toward the left and towards the brake applied position shown in FIG. 1. Since the spring force is a constant and the force opposing the spring varies with pressure, a spring value can be selected to establish the desired limit.

While the force resulting from the spring 134 and the force resulting from the pressure acting on the closed valve seat 110 predominate in the operation just described, another force results from the pressure in the service reservoir 20 which acts upon the effective area of the seal 132 to assist the force of the spring 134 in urging the plunger 60 to the left or brake applied position.

The pressure in the service reservoir 20 cannot exceed the pressure in the protected system between the check valve 124 and the actuator 12 when the plunger 60 is toward the right and the parking brake valve is in its brake released position as shown in FIG. 2 for the reason that the check valve 112 will open in response to such a differential in pressure against the relatively light biasing action of the spring 116 until the pressures in the reservoir 20 and the protected system between check valve 124 and the actuator 12 are equalized.

Under certain operating conditions or failure of components in the service brake system it is possible for the air pressure in the service brake system to be depleted to a point below a predetermined level, for example, 45 psi. Under such conditions, it is the function of the parking brake control valve 10 to automatically assume the brake applied position shown in FIG. 1. This is accomplished through an additional force acting in conjunction with those forces already described and results from the differential in pressure between the protected reservoir 22 and the service reservoir 20 acting on the piston 68 over an area defined by the seal 76. Since the force due to pressure at the right of the piston will be relatively high and the force due to pressure at the left of the piston will be at a minimum, a force results, acting to the left to augment the force of the spring 134 and urges the plunger 60 from the brake release position shown in FIG. 2 to the brake applied position shown in FIG. 1. The low pressure value at which the automatic brake application takes place is determined principally by the effective areas of the piston seal 76 and O-ring 132.

Once the parking brake actuator 12 has been applied by exhausting the air therefrom, either manually by the operator or automatically upon loss of service reservoir pressure, the parking brake control valve 10 will remain in the applied position until the plunger 60 is manually moved by the operator to the brake released position shown in FIG. 2. Four different conditions in terms of systems air pressures can be encountered.

Under one of the conditions, the pressures in both the service reservoir 20 and the protected reservoir 22 can be relatively high and substantially equal. This is the normal and consequently most frequently encountered condition. The parking brake control valve 10 will remain in either the applied position as shown in FIG. 1 or the released position as shown in FIG. 2. In the applied position air pressure acting to the left upon the effective area of the seal 132 plus the force of the spring 134 will combine to overcome the force of the air pressure acting upon the valve element 102 over the effective area defined by the annular valve seat 108. In the released position air pressure acting upon the area defined by valve member 102 against annular lip 110 will hold plunger 60 to the right against the bias of spring 134 and the air pressure acting upon the effective area of O-ring 132.

In another condition of operation, the air pressures in the two reservoirs 20 and 22 can be relatively low and substantially equal. Such a condition might be encountered after a vehicle has been inactive for a long period of time, during which the pressures have become become depleted. Under such conditions, no combination of low air pressures reacting on the effective areas of piston seal 76, O-ring 132 and the annular valve seat 108 which is closed by the valve element 102 will generate a force of sufficient magnitude to move the plunger 60 to the right to overcome the force of the spring 134 acting in the opposite direction. As a result, the valve will remain in its brake applied position as shown in FIG. 1.

Under a third condition of operation, the air pressure in the protected reservoir 22 can be at a relatively high level and the pressure in the service reservoir 20 may be relatively low and below the preselected, automatic parking brake application pressure. Under this condition, the parking brake control valve 10 will remain in the applied position as shown in FIG. 1 as a result of the combination of forces referred to earlier in connection with the explanation of automatic application of the parking brakes resulting from low air pressure in the service reservoir 20.

Under the fourth condition of operation, the air pressure in the service reservoir 20 can be substantially above that of the protected reservoir 22. If the parking brake control valve 10 is in the brake applied position shown in FIG. 1 and the air pressure in the protected reservoir 22 is at or near zero with the pressure in the service reservoir 20 above the preselected automatic parking brake application pressure, the plunger 60 will initially move to the right until the shoulder 92 on the valve plunger 60 engages the valve member 90. This movement also will result in opening of the passage through the annular valve seat 108 so that any pressure remianing within the tubular member 40 and the protected reservoir 22 will bleed to the atmosphere around the annular lip 108 and the plunger remains in the applied position by virtue of the bias of the spring 134 being sufficient to overcome the opposing net force of the air pressure reacting on seal 76 of the piston 68 and also in the opposite direction on the area defined by the annular lip 96 of the valve 90 which is in the closed position. The net difference between the two pressure forces is not sufficient to overcome the force of the spring even when the pressure in the service reservoir 20 is at a maximum.

Following an automatic parking brake application, as a result of low air pressure in the service reservoir 20, it may be desirable to release the brakes, at least temporarily, so that the vehicle can be moved to a safer stopping location. This is accomplished by the driver by pushing the knob 82 and the plunger 60 to the position illustrated in FIG. 2 so that any air pressure remaining in the protected reservoir 22 is utilized to release the parking brake actuator 12.

In the conventional air brake system, the air compressor delivers air until a predetermined pressure level, such as 125 psi, is attained, at which time the compressor ceases its compressing function. When the pressure in the air system drops to some predetermined low, for example, 100 psi the compressor again begins its compressing cycle. This causes a fluctuation in pressures which is imposed on the brake system. Such fluctuations are avoided in the protected reservoir and its associated parking brake units which, under all normal conditions, remain at or near the maximum pressure of the compressor, that is, 125 psi. This feature results from the action of check valve 28 and check valve 112 allowing air under pressure to enter the parking brake system but restricting the flow of air in the opposite direction.

In the event of failure of the protected reservoir, the service brake system is protected against loss of air pressure through the break in the protected system by virtue of the check valves 24 and 124. Under this condition of failure, the parking brakes can be released from their applied condition by means of air pressure contained in the service reservoir. The operator accomplishes this by moving the plunger 60 to the brake released position thereby permitting air pressure from the service reservoir to enter the parking brake unit 12 through the open valve 90 and the check valve 112. With the plunger in this position escape of air to atmosphere from the actuators is prevented by valve 102 closed against annular lip 110 and check valve 124 which interrupts communication to the failed protected reservoir system.

What is claimed is:

1. A parking brake control valve comprising a housing, a first inlet port adatped for connection to a first source of air under pressure, a second inlet port adatped for connection to a second of air under pressure, a pressure outlet port adapted for communication with a parking brake, an exhaust port open to the atmosphere, a valve control means slidable in said housing between a brake applied position and a brake released position and including a first control valve closing said first inlet port to said pressure outlet port when said control means is in said brake applied position and opening said first inlet port to said outlet port when said control means is in said brake released position, a second control valve closing said second inlet port to said outlet port and opening the latter to said exhaust port when said control means is in said brake applied position and closing said exhaust port and opening said second inlet port to said outlet port when said control means is in said brake released position, said valve control means including a piston is said housing between said inlet ports and separating said inlet ports from each other, biasing means urging said control means to said brake applied position, said valve control means being movable from brake released to brake applied position in response to the presence of pressure at said first inlet port and at one side of said piston below a predetermined minimum and being manually movable against the action of said biasing means to a brake released position when the pressure at the other side of said piston is below a predetermined minimum, and check valve means between said outlet port and said second inlet port preventing communication therebetween when said control means is in a brake released position and the pressure at said second inlet port is less than at said first inlet port.

2. A parking brake control valve as set forth in claim 1 in which said second valve presents a pressure responsive surface when said control means is in said brake released position, said surface being responsive to pressure at said pressure outlet port in excess of said predetermined minimum to maintain said control means in said brake released position against the action of said biasing means.

3. A parking brake control valve as set forth in claim 2 in which said check valve means is closed in response to pressure acting on said pressure responsive surface in excess of the pressure at said second inlet port.

* * * * *